United States Patent [19]

Beal

[11] Patent Number: 4,889,146
[45] Date of Patent: Dec. 26, 1989

[54] APPARATUS FOR COOLING A WEB

[75] Inventor: Lawrence E. Beal, Wadsworth, Ohio

[73] Assignee: Eagle-Picher Industries, Inc., Cincinnati, Ohio

[21] Appl. No.: 275,715

[22] Filed: Nov. 23, 1988

[51] Int. Cl.$^4$ .............................................. B08B 7/04
[52] U.S. Cl. ................................... 134/64 R; 34/147;
68/44; 68/158; 68/205 R; 100/118; 100/151;
118/324; 118/428; 198/626; 198/778; 134/122
R; 242/55
[58] Field of Search ...................... 134/64 R, 64 P, 67,
134/68, 71–75, 122 R, 122 P, 127, 130, 131, 132;
68/44, 158, 205 R; 34/147; 242/55; 198/626,
778; 118/324, 428; 99/404, 405; 210/494.1;
100/118–120, 151–154, 177

[56] References Cited

U.S. PATENT DOCUMENTS

| 899,339 | 9/1908 | Shuman et al. | 68/205 R X |
| 1,397,985 | 11/1921 | Schmidt, Jr. | 198/778 X |
| 1,799,713 | 4/1931 | Walker | 242/55 |
| 3,806,056 | 4/1974 | La Tour | 242/55 |
| 4,365,422 | 12/1982 | Kawaguchi | 34/147 X |
| 4,475,643 | 10/1984 | Klingenberg | 198/778 X |

FOREIGN PATENT DOCUMENTS 156698 12/1980 Japan ................................ 100/154

Primary Examiner—Philip R. Coe
Attorney, Agent, or Firm—Wood, Herron & Evans

[57] ABSTRACT

Two endless belts are formed of steel mesh. The belts are run side-by-side spiralling into the center of the apparatus, reversed and spirally wound out of the apparatus with the outgoing convolutions interleaved between the incoming convolutions. The belts present an inlet at one side of the apparatus and an outlet at the other side of the apparatus. The web is fed into the inlet and conveyed to the outlet. Two or more spiral sections can be run in tandem.

4 Claims, 3 Drawing Sheets

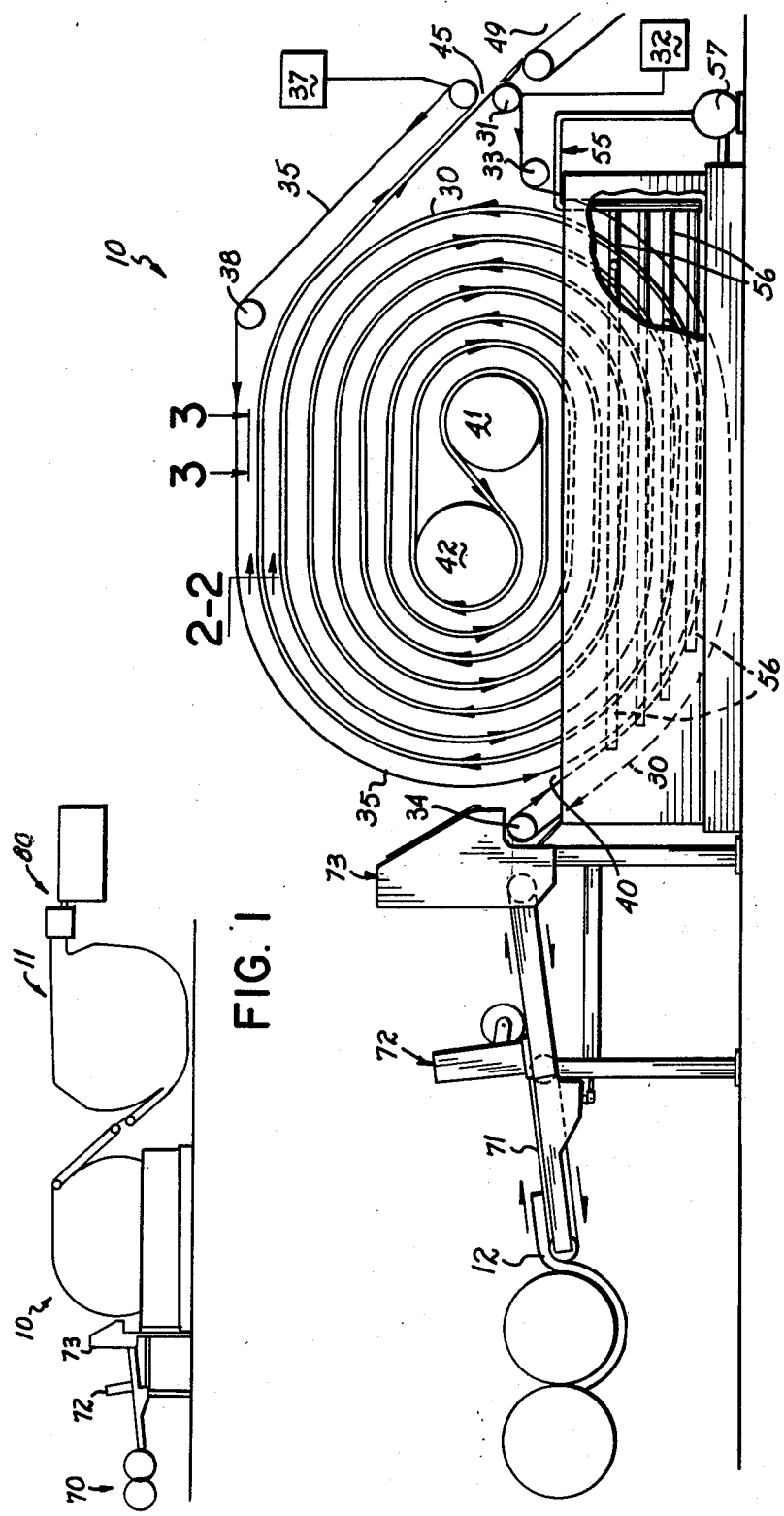

APPARATUS FOR COOLING A WEB

BACKGROUND OF THE INVENTION

This invention relates to apparatus for cooling a web. The apparatus is particularly applicable to the cooling of soft, uncured rubber stock.

The rubber stock comes off a mill in web form at a temperature of between 180° and 320° F. The stock is usually stacked and held in bins awaiting further processing. It is necessary to cool the stock before it is stacked and placed in bins, for otherwise the high temperature of the rubber will effect a partial cure before it can be processed.

One apparatus for cooling the stock consists of a plurality of parallel spaced transverse bars that are mounted between two endless chains. The stock is festooned over the bars and slowly transported from one end of the endless chains to the other. As the stock is being conveyed in festoon fashion on the endless chains, fans blow over the stock to cool it.

The festooning approach is not satisfactory for stiffer green, uncured stock. It simply does not festoon well. Further, the wide web coming off the mil (30 inches to 48 inches wide) is usually split into narrower strips before being cooled. Stock that is longitudinally split upstream of the cooling process is difficult to handle. Still further, there is a tendency of the festooned stock to take a set over the bars, thus imparting a series of transverse bosses into the web. A further major disadvantage of the festooning approach is the floor space required for the apparatus.

An objective of the present invention has been to provide an improved apparatus for cooling an uncured rubber web.

Another objective of the invention has been to provide a maximum square footage of material exposure to cooling in a minimum cubic footage of space.

SUMMARY OF THE INVENTION

These objectives of the invention are attained by providing two wire mesh belts running side-by-side to carry the web between the adjacent runs of belt. The pair of belts is spirally wound about a horizontal axis. At the center of the spiral, the path of the pair of belts is reversed to provide an exit path of spirally wound belt. The incoming convolutions of belt are interleaved between the exiting convolutions of belt. Adjacent convolutions are spaced apart by about 6". It can be seen from the foregoing that the spiral can be rather tightly wound but without any sharp bends that cure or partially cure kinks into the web during the cooling process. The spirally wound apparatus, therefore, provides a maximum square footage of material being exposed to a coolant in a minimum cubic footage of space.

It is contemplated that a non-tack coating will be applied in a water cooling bath and that cooling air can be blown through the spiral to effect further cooling by evaporation and convection.

In one form of the invention, two spirally wound systems are positioned in tandem. In the upstream system, the coolant non-tack suspension is sprayed upon the lower convolutions of the spiral. In the second stage, fans direct air through the spiral to evaporate the coolant and to further cool the web.

BRIEF DESCRIPTION OF THE DRAWINGS

The several objectives and features of the present invention will become more readily apparent from the following detailed description taken in conjunction with the accompanying drawing in which:

FIG. 1 is a diagrammatic side elevational view of the invention;

FIGS. 1A and 1B are diagrammatic left and right section views of FIG. 1;

DETAILED DESCRIPTION OF THE INVENTION

Figure 1B:
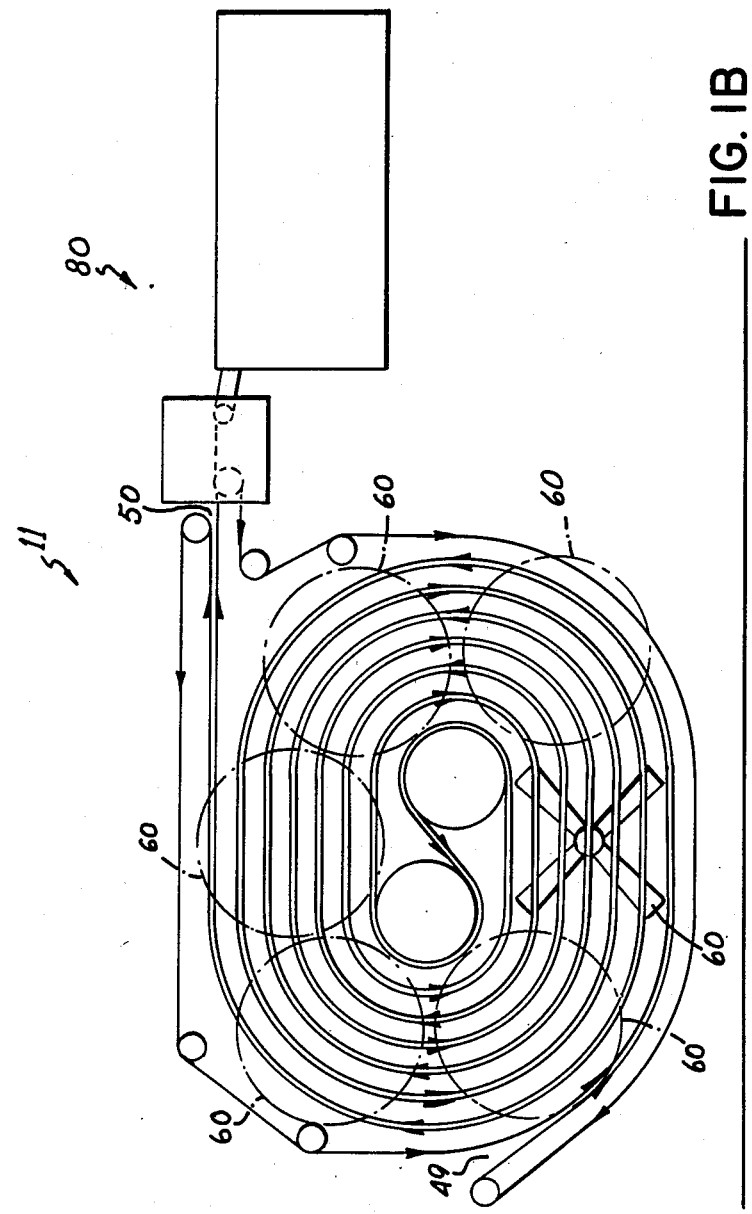

The apparatus of FIG. 1 is a preferred form of apparatus although as will be seen the apparatus admits of a number of variations.

Figure 2:
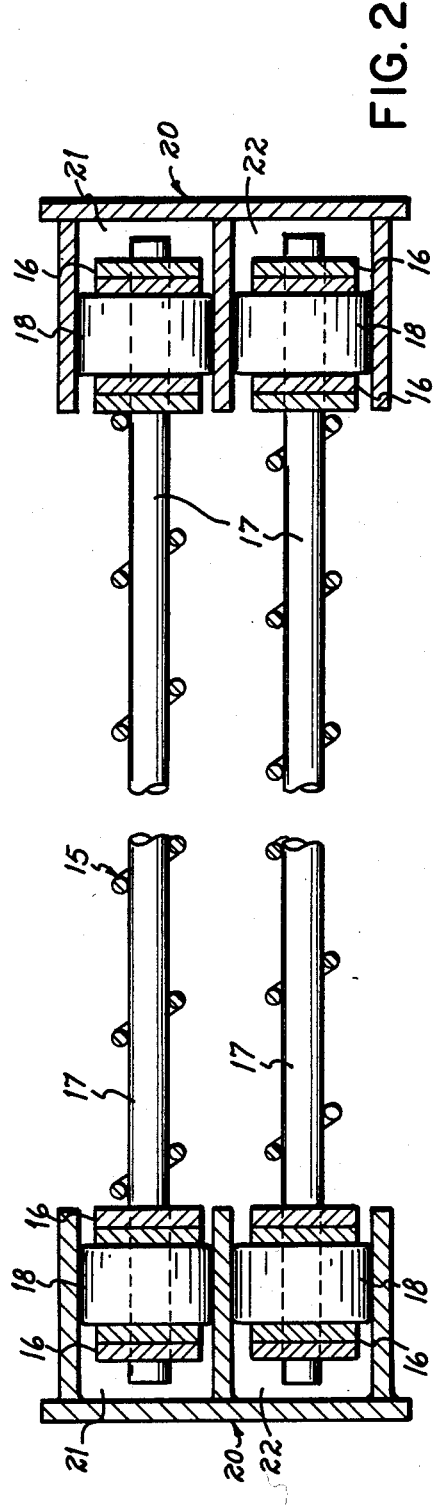
FIG. 2 is a cross-sectional view taken along lines 2—2 of FIG. 1.
Figure 3:
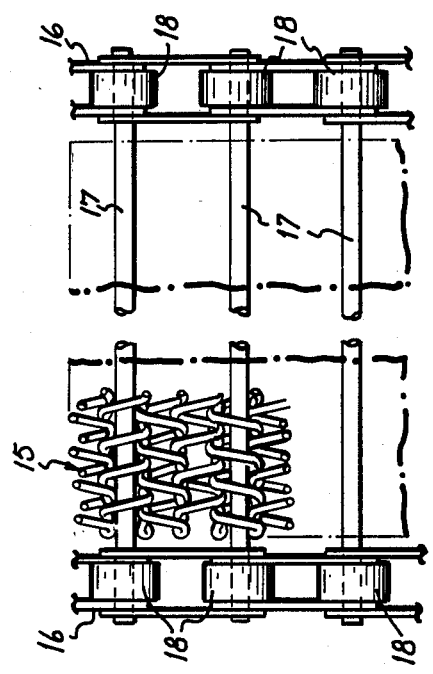
FIG. 3 is a cross-sectional view taken along lines 3—3 of FIG. 1.

The heart of the apparatus is the spiral wound section indicated at 10 and 11. Each section 10 or 11 has two wire mesh belts 15 that will carry a web 12 through the cooling process. The belts are of the type shown in FIG. 3. They consist of a wire mesh 15 through which air and water can circulate. The mesh 15 is mounted between two endless chains 16 and supported on rods 17 that pass through each pair of rollers 18 forming the endless chains. The rollers are preferably plastic. The rollers ride in a track assembly 20 (FIG. 2) having two channel-shaped compartments 21 and 22. Two channels are required because two endless belts with respective chains are run side-by-side throughout most of the apparatus.

A first belt 30 passes around a pair of drive sprockets 31 that are driven by a motor 32. The belts pass over idler sprockets 33 and 34.

A second belt 35 passes around a pair of drive sprockets 36 driven by a motor 37. The belt 35 also passes over a pair of idler sprockets 38.

In the area indicated at 40, a run of belt 30 comes together with a run of belt 35. There, the chains carrying the belts enter the dual channel track 20 shown in FIG. 2. The dual track confines the two chains in the section 10 in FIG. 1 throughout the excursion through the section except at the center of the section.

At the center of the section are two pairs of sprockets of about 24" in diameter indicated at 41 and 42. The incoming pair of belts, indicated by the arrows running counterclockwise, first pass over the pairs of sprockets 41 and then, by passing over the pairs of sprockets 42 reverse their direction from counterclockwise to clockwise. The belt pairs having the clockwise arrows are exiting the section. The counterclockwise portion of the belt is depicted as about four convolutions of belt. The clockwise portions are depicted as about four clockwise convolutions of belt interleaved between the counterclockwise convolutions of belt.

The clockwise convolutions exit at about the area 45. The respective belts forming the belt pair pass over the drive sprockets 31 and 36, respectively. Belt 30 passes over sprockets 31 and 33 and under the section 10 back to the starting point at idler roller 34. Belt 35 passes over sprockets 36 and 38 and over the section 10 until it returns to the entrance point or inlet at the area 40.

From the foregoing description, it can be seen that there are, over the most part of the section 10, two belts running together as a pair into which the web to be cooled is fed. The pair of belts carry the web counterclockwise through four convolutions into the center area of the section, reverse and pass clockwise through four convolutions until the web is carried to an outlet at 45.

At the outlet, it is preferred that a second section 11 be placed in tandem with the first section 10. The second section 11 is spirally wound just as the first section 10 is to provide an inlet 49 and an outlet 50. The particular positioning of the inlet and particularly the outlet is dictated by the type of apparatus with which the section is used.

At section 10, the lower convolutions may pass through a bath of coating and precooling liquid. The coating and precooling liquid can be a suspension of ground clay and water or zinc stearate and water. The water performs a cooling function and the clay or zinc stearate that is left on the web after it is dried eliminates the tackiness of the webs and permits the webs to be separated for further processing. As an alternative to the bath, a coating header 55 may be employed. The coating header has a plurality of horizontal tubes 56, each having a plurality of transverse nozzles by which liquid is directed transversely through the spiral wound belts and exposed web. The coating header could be on either or both sides of said section 10. A pump 57 is provided to supply the liquid under pressure. Preferably, the convolutions of belt pairs are spaced from each other by about 6" so as to provide room for the passage of the cooling fluids.

In the downstream section 11, a plurality of fans 60 are provided to blow air transversely across the belts and the web carried by them so as to cool the web by evaporation of the liquid left in the first cooling stage and by convection.

Upstream of the apparatus are conventional stations. First is a mill 70 in which the rubber and chemicals are milled and a web is formed. The web is fed to a take-off conveyor 71.

A printer 72 embosses a number repeatedly on the web, the number corresponding to the quality of the material being milled during the particular run.

Immediately upstream of the section 10 is a slitter 73 having seven transversely-spaced knives that longitudinally slit the stock. The knives may be notched so that an imperfect slit is formed thereby holding the strips (eight in the illustrated example) together their traverse through the cooling apparatus, thereby making the web easier to handle.

At the discharge end of the section unit 11, a conventional cutter and stacker 80 is provided to cut the web transversely into slabs or to zig-zag fold the slab. The cooled rubber is stacked on pallets and transported to bins for further processing.

While the preferred form of the invention shows two sections 10 and 11, it should be understood that a single section could be employed for lower volumes that can be held in the single cooling stage longer than would be permitted in the high-speed apparatus of the preferred embodiment.

Instead of a cooling bath or cooling spray as shown, the web could pass through a cooling bath between the slitter and the section 10 so as to have the coating applied before entrance into the cooling section. In that embodiment, fans could be applied to the single section. Still another alternative would be to employ the liquid coating and precool bath as disclosed and run slowly enough so that complete cooling is effected without fans. An air knife at the exit end of the apparatus could be applied to drive the remaining coolant off the web before feeding it to the stacker.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. Apparatus for cooling a web comprising:

two endless mesh belts, means for establishing a spiral path for said belts wherein said belts lie side-by-side over a major portion of said path, said spiral path being about a horizontal axis, said belts, where they lie side-by-side, being spaced apart to receive said web, means for driving said belts, a tank, the lower portion of said side-by-side belts passing in and out of said tank, and means for subjecting said lower portion of said belts to a cooling liquid.

2. Apparatus for cooling a web comprising:

two endless mesh belts, means for establishing a spiral path for said belts wherein said belts lie side-by-side over a major portion of said path, said spiral path being about a horizontal axis, said belts, where they lie side-by-side, being spaced apart to receive said web, means for driving salt belts, a spray assembly on at least one side of said belts, said spray assembly having a plurality of horizontally-directed nozzles for directing a liquid onto a web confined between belts, and means for supplying liquid under pressure to said spray assembly.

3. Apparatus for cooling a web comprising:

two endless mesh belts, means for establishing a spiral path for said belts wherein said belts lie side-by-side over a major portion of said path, said spiral path being about a horizontal axis, said belts, where they lie side-by-side, being spaced apart to receive said web, means for driving salt belts, at least one horizontally-directed fan positioned at the side of said spiral of belts to pass cooling air over said web.

4. Apparatus for cooling a web comprising:

first and second cooling sections, each cooling section comprising, two endless mesh belts, means for establishing a spiral path for said belts wherein said belts lie side-by-side over a major portion of said path, said spiral path being about a horizontal axis, said belts, where they lie side-by-side, being spaced apart to receive said web, each section having an inlet and an outlet for said web, the outlet of said first section being adjacent the inlet of said second section whereby said web can pass from said first section to said second section, means for driving the belts in each section, means adjacent said first section for spraying a coolant on said web, and fans adjacent said second section for drying and further cooling said web.

* * * * *